United States Patent [19]

Brown

[11] 4,107,558

[45] Aug. 15, 1978

[54] LINEAR INDUCTION MOTOR ASSEMBLY

[75] Inventor: Geoffrey Edward Brown, Thornhill, Canada

[73] Assignee: Spar Aerospace Products Ltd., Toronto, Canada

[21] Appl. No.: 791,787

[22] Filed: Apr. 28, 1977

[30] Foreign Application Priority Data

Apr. 30, 1976 [CA] Canada .................. 251532

[51] Int. Cl.² ........................................... H02K 41/02
[52] U.S. Cl. ....................................... 310/13; 310/198
[58] Field of Search ................................ 310/198–202, 310/12–14, 184, 185, 186, 203–207; 104/148 R, 148 LM; 318/135

[56] References Cited

U.S. PATENT DOCUMENTS

| 3,621,311 | 11/1971 | Von Starck | 310/13 |
|---|---|---|---|
| 3,622,818 | 11/1971 | Payen | 310/13 |
| 3,746,899 | 7/1973 | Eastham | 310/12 |
| 3,851,231 | 11/1974 | Eastham et al. | 310/13 X |
| 3,942,050 | 3/1976 | Oberretl | 310/13 |
| 3,958,138 | 5/1976 | Eastham et al. | 310/13 |

*Primary Examiner*—Donovan F. Duggan
*Attorney, Agent, or Firm*—Fetherstonhaugh & Co.

[57] ABSTRACT

In a primary member for a single-sided linear induction motor having a core member and a plurality of multi-turn coils connected to one another in a plurality of phase groups, each phase group being arranged in a plurality of longitudinally spaced pole groups, each consisting of a plurality of coils, the coils of each pole group being connected to each other at a side of the core, the improvement wherein; the coils of each phase group are connected to one another at connection points arranged on the same side of the core, the connection points of one pole group being disposed at the opposite side of the core to that at which the connection points of at least one adjacent pole group are located.

6 Claims, 7 Drawing Figures

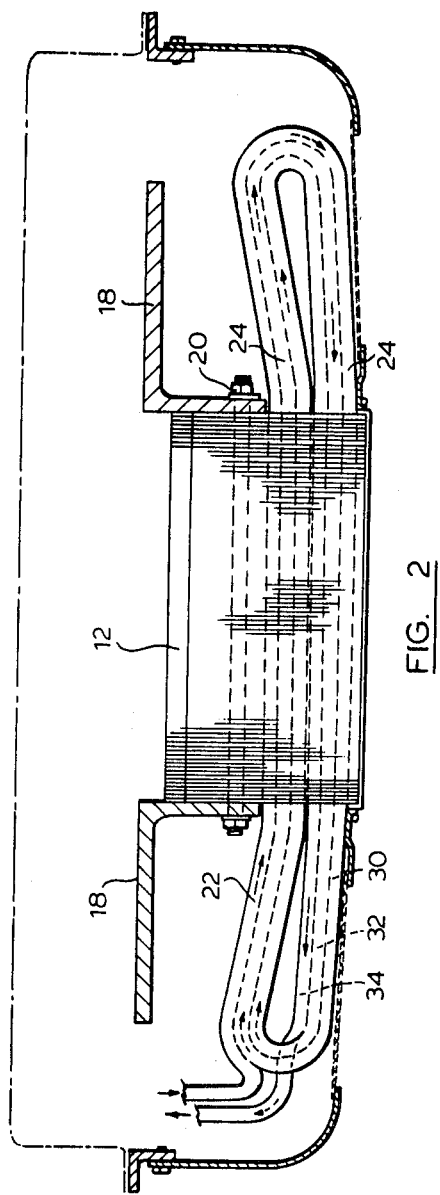

LINEAR INDUCTION MOTOR ASSEMBLY

FIELD OF INVENTION

The invention relates to linear induction motors. In particular, this invention relates to improvements in the manner of making the connections between the coils of a low voltage induction motor.

PRIOR ART

Considerable difficulty has been experienced in attempting to assemble a low voltage single-sided linear induction motor because the proportions of a turn required to provide low voltage coils are such that it is difficult to maintain the coils in a close side by side relationship and to form the required connections between the inner turn of one coil and the outer turn of the next adjacent coil when the coils are in the close side by side relationship.

Heretofore adjacent coils of linear induction motors have been connected to one another along one side of the core member. This arrangement has made it difficult to obtain a balanced cooling of the coil in use. In addition, because all the connections are made of one side of the core it is difficult to distinguish the coils of one pole group from the coils of the next adjacent pole group for assembly purposes with the result that, without repeated and careful checking, there is a likelihood that one coil of one phase group may be inadvertently connected to a coil of another phase group.

SUMMARY OF INVENTION

The present invention overcomes the difficulties of the prior art described above by providing an improved primary member for a single-sided linear induction motor in which the coils of each phase group are connected to one another at connection points arranged on the same side of the core and the connection points of one pole group are disposed at the opposite side of the core to that at which the connection points of at least one adjacent pole group are located.

According to one aspect of the present invention, there is provided in a primary member for a single-sided linear induction motor having a core member and a plurality of multi-turn coils connected to one another in a plurality of phase groups, each phase group being arranged in a plurality of longitudinally spaced pole groups, each of said pole groups consisting of a plurality of coils, the coils of each pole group being connected to each other at a side of the core, the improvement wherein; the coils of each phase group are connected to one another at connection points arranged on the same side of the core, the connection points of one pole group being disposed at the opposite side of the core to that at which the connection points of at least one adjacent pole group are located.

PREFERRED EMBODIMENT

The invention will be more clearly understood after reference to the following detailed specification read in conjunction with the drawings, wherein FIG. 1 is a pictorial view of the underside of a primary member of a linear induction motor according to an embodiment of the present invention;

FIG. 2 is a sectional view along the line 2—2 of FIG. 1;

Figure 1:
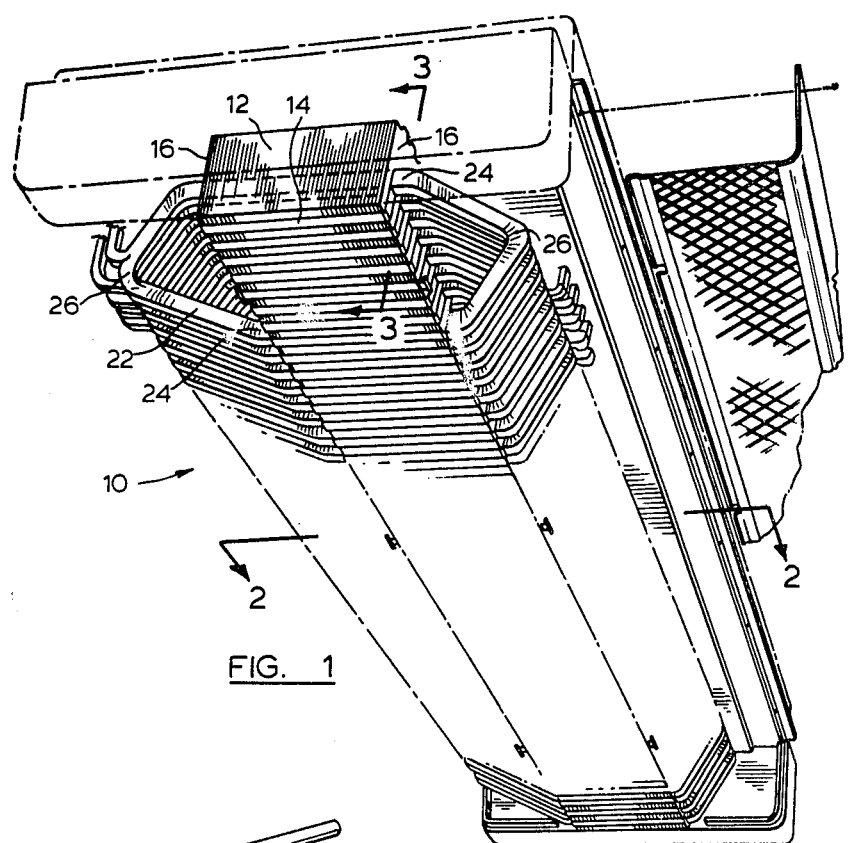
Figure 4:
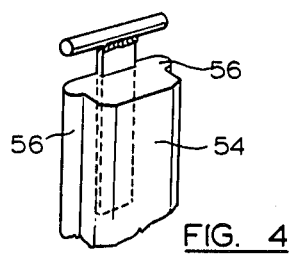
FIG. 4 is a detail view of a mounting bracket for use in mounting the side covers.

With reference to FIG. 1 of the drawings, the reference numeral 10 refers generally to the primary member of a single-sided linear induction motor according to an embodiment of the present invention. The primary member includes a core member 12 of a conventional construction formed with a plurality of coil receiving slots extending transversely thereof between the oppositely disposed longitudinally extending side faces 16 thereof. The core 12 is mounted between a pair of frame members 18 by means of a plurality of bolts 20 which extend through the plates of the core and clamp them together between the frame members 18 (FIG. 2).

The coils are generally identified by the reference numeral 22. Right and left-hand coils are provided. The right and left-hand coils are substantially the same, the difference being that the terminal connections of the right-hand coil are made at the right-hand side of the core and the terminal connections of the left-hand coil are made at the left-hand side of the core. Each coil 22 has a pair of oppositely disposed transversely extending side portions 24 which are located in longitudinally spaced apart slots 14 of the core, one of the side portions 24 of each coil being located adjacent the upper end of each slot 14 and the other side portion 24 being located adjacent the lower end of its slot 14. Each coil 22 has a direction reversal nose portion 26 located on opposite side of the core 12.

Figure 3:
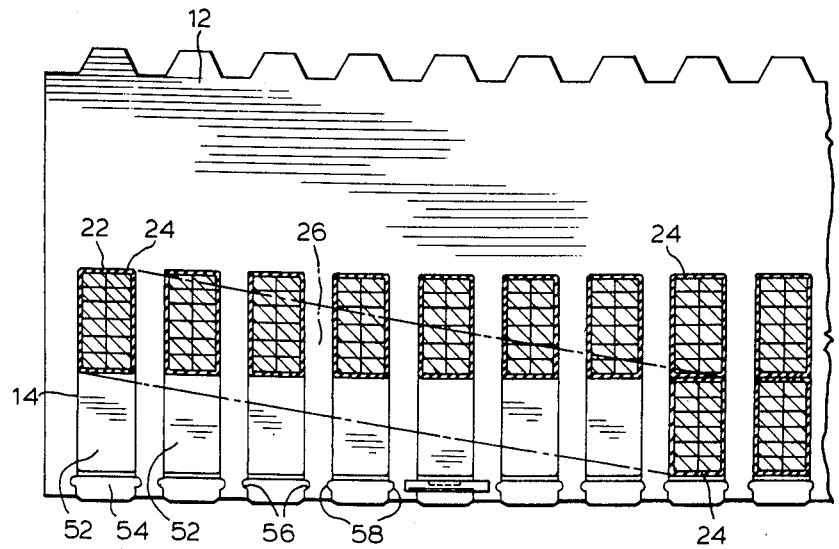
FIG. 3 is a sectional view along the line 3—3 of FIG. 1.
Figure 5:
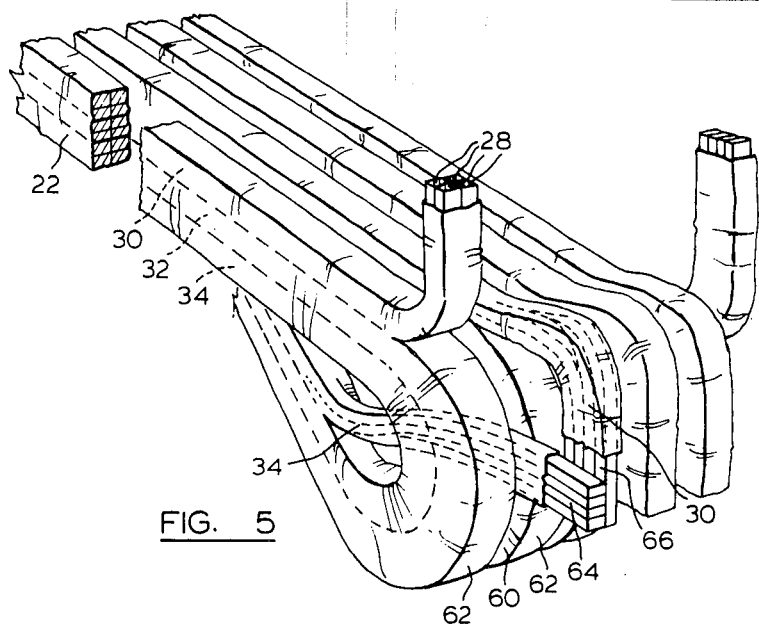
FIG. 5 is an enlarged detail view of one end of a pole group of coils.

As shown in FIGS. 2, 3 and 5 of the drawings, each coil 22 has four conductor strands 28 which extend continuously around the coil to provide an outer turn 30, intermediate turn 32 and inner turn 34.

Figures 6, 6A:
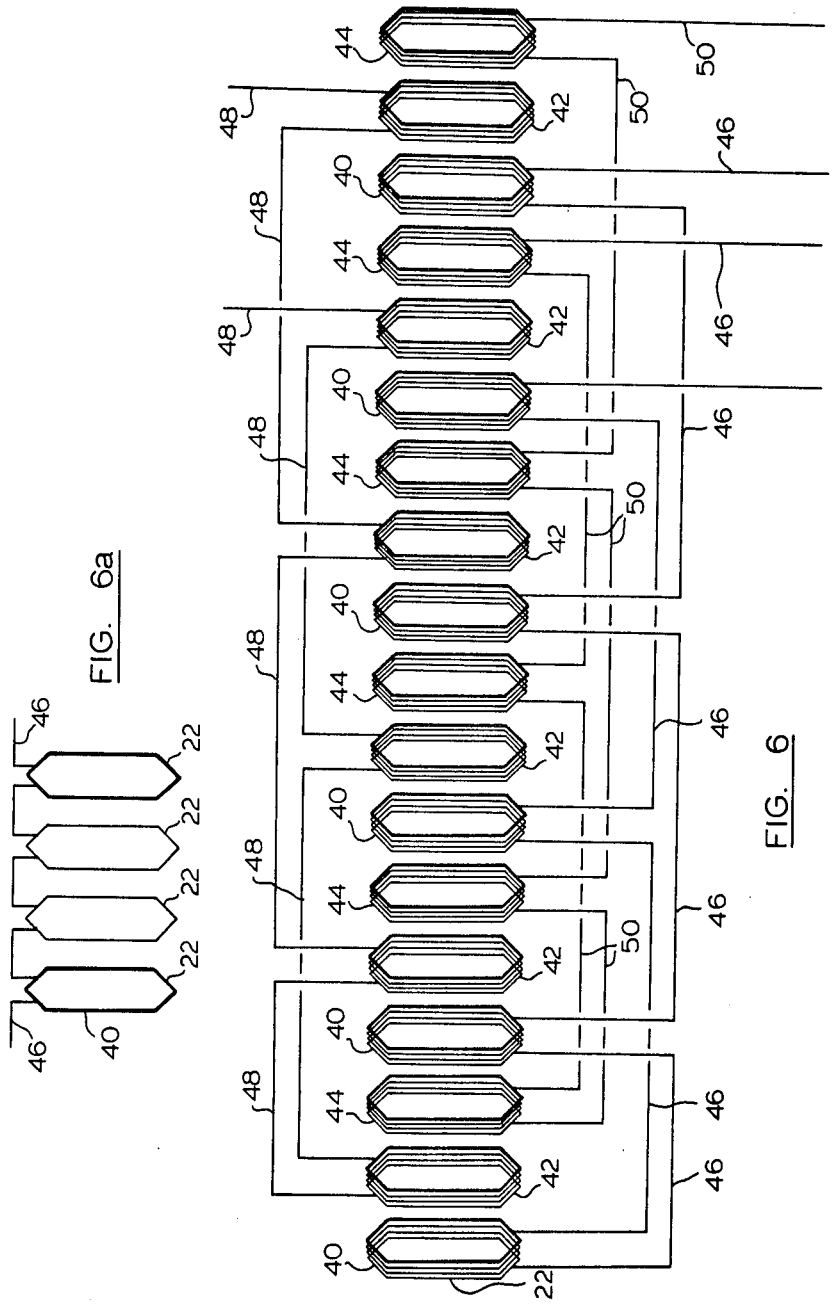
FIG. 6 is a diagrammatic illustration of a three-phase six-pole linear induction motor in which each pole has four coils connected to one another.
FIG. 6a is a diagrammatic illustration of the manner in which the coils of each pole group are connected to one another.

As will be seen from FIG. 6 of the drawings, each of the three phases has six pole groups each consisting of four coils. As will also be seen from FIG. 6 of the drawings, the connections between the pole groups of the first and third phase coils are made at one side of the core and the connections between the pole groups 42 of the second phase coils are made at the opposite side of the core. The lines 46 serve to connect the pole groups 40 of the third phase and the lines 48 and 50 serve to connect the pole groups 42 and 44 of the second and first phases respectively.

As shown in FIG. 6a of the drawings, each of the pole groups 40 consists of four coils connected to one another in series.

As illustrated in FIGS. 1 and 3 of the drawings, the transversely extending side portions 24 of each coil are located in two slots 14 of the core which are separated from one another by six slots 14. One of the transversely extending side portions of each coil is located at the upper end of the slot 14 and the other portion 24 is located at the lower end of the slot 14, the end portions 26 of each coil extend angularly between the transverse portions 24 as shown in FIG. 3 of the drawings. Also as shown in FIG. 3 of the drawings, filler members 52 are located in the slots 14 which are not occupied by two transverse portions 24 of two coils. The fillers 52 and coil portions 24 are retained in position by wedges 54 which have rounded flanges 56 extending longitudinally of the upper edge thereof adapted to fit in a close fitting relationship within grooves 58 which extend longitudinally of the slots 14. The wedges 54 are preferably made from an insulating material such as siluminite and project downwardly below the lower face of the core 12. The wedges 54 will act as skids in the event that the primary member comes in contact with the secondary member so as to prevent damage to the secondary and primary members resulting from contact one with the other.

FIG. 5 of the drawings serves to illustrate the manner in which the connection is made between adjacent coils 22 of one pole group of coils. As shown in FIG. 5, a narrow passage 60 is provided between the adjacent nose portions 62 of the adjacent coils. In order to make a connection between the inner turn 34 of one coil and the outer turn 30 of the next adjacent coil, it is necessary to bring the conductors 28 of the inner turn 34 outwardly through the narrow passage 60. In order to minimize the width of the terminal end 64 of the inner turn 34, the four conductors 28 are stacked one on top of the other and project through the passage 60. The four conductors 28 of the terminal end 66 of the next adjacent coil 22 are also stacked one on top of the other so as to be locatable in a side by side relationship with the terminal end 64 of the inner turn 34 of the adjacent coil. The terminal ends 64 and 66 are connected to one another as by brazing or the like. The outer winding 30 of the first coil of each pole group and the inner winding 34 of the last coil of each of each pole group are connected to one another or to the power source as diagrammatically illustrated in FIG. 6 of the drawings.

As previously indicated with reference to FIGS. 1 and 6 of the drawings, the terminal connections of the pole groups 40 and 44 are located on one side of the core and the terminal connections of the pole group 42 are located on the other side of the core. As will be apparent from FIG. 5 of the drawings, considerable difficulty is experienced in attempting to provide sufficient space between the adjacent noses of the coils which are to be connected to one another to permit the terminal ends 64 to project outwardly from the coils for connection to the terminal ends 66. As a result, in the assembly operation the passages 60 tend to be somewhat wider than the distance between the adjacent slots 14 of the core. It is desirable to maintain the slots 14 of the core as close to one another as possible in order to minimize the length and weight of the primary member. By reason of the fact that all of the terminal connections of the coils of the motor of the present invention are not made at the same side of the motor, the terminal connections of each pole group are made adjacent the end of at least one pole group at which no terminal connections are made with the result that the cumulative effect of the enlargement of the passages 60 does not extend beyond two pole groups.

With reference to FIG. 6 of the drawings, it will be seen that the terminal connections of the coils of the pole groups 40 and 44 are made adjacent the end of the pole group 42 opposite to the end thereof at which its terminal connections are made. As a result of this arrangement, the cumulative effect of the longitudinal enlargement of the spacing between the noses 62 of the adjacent coils at the ends at which the terminal connections are made does not extend beyond two pole groups as the enlargement of the spacing 60 can be taken up by a reduction in the width of the spaces 60 between the ends of the coils at which the terminal connections are not made.

As shown in FIG. 6 of the drawings, the terminal connections of no more than two pole groups 40 and 44 are located side by side. This simplifies the assembly of the structure as it is easier for the mechanic responsible for the assembly to identify the terminal connections of the coils of the different pole groups of the different phases. For example, in the embodiment illustrated in FIG. 6 of the drawings, no more than eight terminal connections will be located side by side one another and the mechanic can with ease visually divide these terminal ends into two groups of four and can with confidence make the required connections between the coils of each pole group. This considerably simplifies the assembly operation.

The arrangement of the terminal ends of the coils on both sides of the core is such that the center of gravity of the assembly is located closer to the center of the width of the core.

As previously indicated, the manner in which the terminal connections of the coils are arranged in accordance with the present invention on both sides of the core is such that it is now possible to produce a low voltage primary member for a single-sided linear induction motor.

What I claim as my invention is:

1. In a primary member for a single-sided linear induction motor having a core member and a plurality of multi-turn coils connected to one another in a plurality of phase groups, each phase group being arranged in a plurality of longitudinally spaced pole groups, each consisting of a plurality of coils, the coils of each pole group being connected to each other at a side of the core, the improvement wherein; the coils of each phase group are connected to one another at connection points arranged on the same side of the core, the connection points of one pole group being disposed at the opposite side of the core to that at which the connection points of at least one adjacent pole group are located.

2. A primary member for a single-sided linear induction motor as claimed in claim 1 wherein the coils are low voltage coils consisting of at least two strands of substantial thickness.

3. A primary member for a single-sided linear induction motor as claimed in claim 1 wherein the coils are low voltage coils in which each turn consists of four strands of substantial thickness, said strands being arranged in side by side pairs one above the other, a terminal end portion of the inner turn of each coil having the four strands arranged one above the other in a narrow configuration and projecting outwardly between the ends of adjacent coils and being connected to a terminal end of the next adjacent coil.

4. A primary member for a single-sided linear induction motor comprising
   (a) a core member having a pair of oppositely disposed longitudinally extending side edges, said core being formed to provide a plurality of coil receiving slots extending transversely between said side edges,
   (b) a plurality of multi-turn coils, each of said coils having a pair of side portions extending transversely of said core member in said longitudinally spaced coil receiving slots thereof and a pair of oppositely disposed ends arranged one at each of said sides of said core member, each of said ends including a direction reversal nose portion, one of said ends being a terminal end having a pair of terminal connections including an input terminal connection and an output terminal connection, the first of said terminal connections communicating with the innermost turn of said coil and the second of said terminal connections communicating with outermost turn of said coil, (c) said coils being connected to one another to form a plurality of phase groups of coils and the coils of each phase group being arranged in a side-by-side relationship and extending in adjacent transverse slots of said core with narrow passages extending between the nose portions thereof, the first terminal end of each coil being arranged to extend outwardly from said innermost turn of the coil through said narrow passage and being connected to the second terminal end of an adjacent coil outwardly from said terminal end of the coil, (d) the terminal ends of each pole group being connected to one another at the opposite side edges of said core to that at which the terminal ends of at least one adjacent pole group are connected whereby the cumulative effect of the longitudinal spacing of the noses of the adjacent coil which facilitates the passage of the first terminal ends therebetween does not extend beyond two pole groups.

5. A low voltage primary member for a single-sided linear induction motor comprising, (a) a core member having a pair of oppositely disposed longitudinally extending side edges, said core being formed to provide a plurality of coil receiving slots extending transversely between said side edges, (b) a plurality of multi-strand low voltage multi-turn coils, each of said coils having an inner turn and an outer turn, a pair of side portions extending transversely of said core member in said longitudinally spaced coil receiving slots thereof and a pair of oppositely disposed ends arranged one at each of said sides of said core member, each of said ends including a direction reversal nose portion, one of said ends being a terminal end having a pair of terminal connections including a first terminal connection which is an extension of said inner turn and a second terminal connection which is an extension of said outer turn, (c) said coil being connected to one another to form a plurality of phase groups of coils and the coils of each phase group being arranged in a side by side relationship and extending in adjacent transverse slots of said core with narrow passages extending between the nose portions thereof, the strands of the first terminal end being arranged in a stack one above the other to minimize the width thereof and extending outwardly from said innermost turn through one of said narrow passages and being connected to the second terminal end of an adjacent coil outwardly from said terminal end of the coil, (d) the terminal ends of each pole group being connected to one another at the opposite side edges of said core to that at which the terminal ends of at least one adjacent pole group are connected whereby the cumulative effect of the longitudinal spacing of the noses of the adjacent coil which facilitates the passage of the first terminal ends therebetween does not extend beyond two pole groups and the terminal ends of each pole group can be readily distinguished from at least one adjacent pole group to facilitate assembly of the various pole groups.

6. A low voltage primary member for a single-sided linear induction motor as claimed in claim 5 wherein each multi-turn coil has three turns and each pole group has four coils and wherein three phase groups are provided, each consisting of six pole groups.

* * * * *